Oct. 7, 1969  K. A. OVRETVEIT  3,470,791

SEALING IN HYDRAULIC MACHINES

Filed Jan. 13, 1967

United States Patent Office 3,470,791
Patented Oct. 7, 1969

3,470,791
SEALING IN HYDRAULIC MACHINES
Karsten Alfred Ovretveit, 87 Lower Road,
Fetcham, Surrey, England
Filed Jan. 13, 1967, Ser. No. 609,044
Int. Cl. F01c 1/14; F04c 1/08, 17/10
U.S. Cl. 91—81     4 Claims

ABSTRACT OF THE DISCLOSURE

A fluid motor has a main motor having a series of blades adapted to enter the slots provided in a sealing motor, the sealing areas of the blades and sealing rotor or the sealing areas of the housing have a covering layer of sealing material cast onto the sealing areas, this sealing material being capable of being worn into a close sealing fit by rotation of the sealing motor and/or blades respectively.

---

Figure 1:
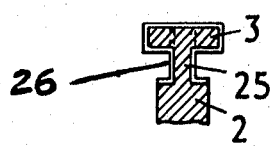
Figure 2:
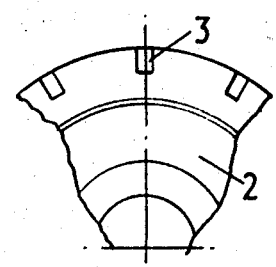
Figure 3:
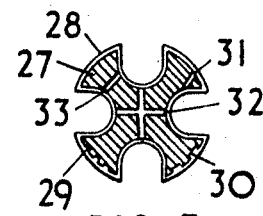
Figure 4:
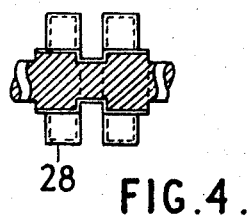

This invention relates to fluid motors and pumps, for example for use in winches, and all hereinafter referred to as fluid motors.

It is desirable to improve the efficiency of these motors by improving the sealing characteristics whilst simplifying the manufacturing operations and an object of this invention is to provide an improved fluid motor.

Accordingly, the invention consists in a fluid motor including a housing having a main rotor provided with blades, a sealing rotor having slots and rotatably mounted on an axis parallel to the rotary axis of the main rotor, gear means connecting the main rotor and sealing rotor together so that they rotate simultaneously in opposite directions in different cylindrical compartments in the housing, the two cylindrical compartments having a mutual longitudinal opening so that the blades can enter the slots provided in the sealing rotor without sealing contact therewith. The blades preferably protruding axially from the main rotor and sealing with the housing, the sealing areas of the blades and/or the sealing areas of the sealing rotors or the sealing areas of the housing adapted to form a seal with the sealing areas of the main rotor, the blades and/or sealing rotors, having a covering layer of sealing material secured onto the sealing areas, this sealing material being any material capable of being polished into a close sealing fit by rotation of the sealing rotor and/or the main rotor.

Examples of the invention are shown in the accompanying drawings which show various sections.

In the drawings are shown the main torque rotor 2 and the sealing rotor 6 of a fluid motor of the general type having a housing in which a rotor provided with blades and a sealing rotor arranged on parallel axes in bearings and geared together to rotate in opposite directions in cylindrical compartments in the housing which has a mutual longitudinal opening, so that the blades can enter corresponding slots in the sealing rotor without sealing contact therewith said blades protruding axially from said main rotor and sealing with said housing the arrangement being such that the main torque is at all times carried by the main rotor in contradistinction to a Rootes type blower or a gear pump wherein the main torque alternates between the co-operating rotors.

The invention is particularly suitable where the rotors are mounted on separate radial and thrust bearings, to obtain accurate rotation. The rotors 6 and 2 with rotor blades 3 are made of strong steel cores 27 and 25 respectively adapted to have a covering 28 and 26 respectively of plastics material such as Teflon or nylon although other suitable material could be used such as white metal. This sealing material can run directly against the sealing areas of the steel or other metal housing 1 without seizing or sticking and can provide a polish-effect and preferably also a self-lubricating effect between the steel housing and the sealing areas of the rotors and rotor blades. The rotor and blade cores 27 and 25 can be provided with depressions 29, dovetailing 30, 34, 35, 36 or holes 31, 32, 33, 34, 39, 41 and the plastic covering is secured to the rotor by securing the plastic covering onto the rotor so that these depressions, dovetails and holes bond the covering layer firmly to the steel cores 27 and 25 of the sealing rotors 6 and the torque rotor 2 with blades 3 respectively.

Figure 5:
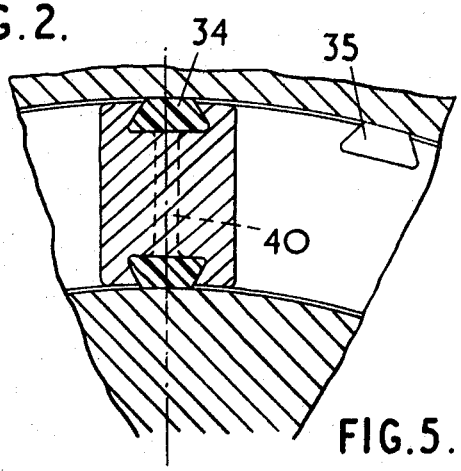
Figure 6:
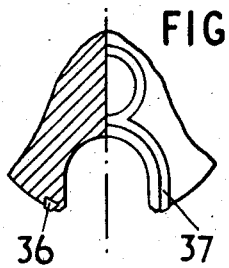
Figure 7:
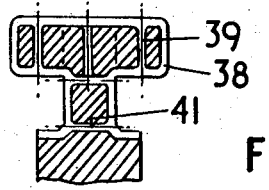

For hydraulic winches working at high oil pressures the sealing surfacing can be done as shown in FIGURES 5, 6 and 7 with as little as possible of the plastic covering layer protruding outside of the rotors 6 and 2 and the rotor blades 3. The plastic covering is held to the said rotors 6 and 2 and the rotor blades 3 by being secured onto the rotor or blade and into the dovetailing slots 34, 35, 36 and holes 40, 41 on the rotors 6 and 2 and the rotor blades 3. The sealing covering 26, 28, 34, 35, 36 is preferably secured onto the rotors 6 and 2 and the blades 3 in an accurate form to give the rotors 6 and 2 and the rotor blades 3 with said sealing surfacing a press fit in their corresponding cylindrical compartments and annular blade grooves in the housing 1 so that the running-in of the rotors 6 and 2 and the blades 3 in the housing 1 provides perfect seals with absolute minimum clearance between the sealing areas of the rotors 6 and 2 and the housing 1.

By this method of sealing between the rotors and housing, the efficiency of the present hydraulic winch is increased and the effect on the winch of temperature variations is reduced. An improvement in the pressure range is also obtained providing facilities for lighter and more compact hydraulic winches. This improved method of sealing between rotors 6 and 2 and the housing 1 has made an improved manufacturing method available for mass-production of the present invention with simplified machining, fitting and testing procedure, thereby reducing the manufacturing time and cost but retaining the improved reliability, performance and efficiency, as well as an improved pressure range, for the fluid motor and the winch or other machine to which it is applied.

Figure 8:
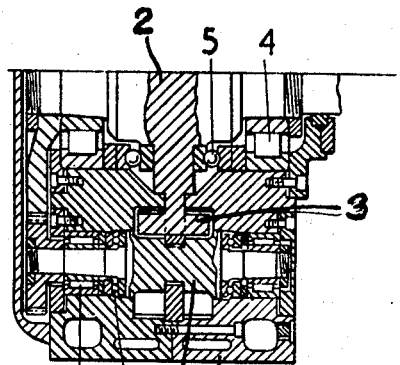

In FIGURE 8 there is shown a motor of the above defined general type and an example of this general type is described in my copending application Ser. No. 609,101 filed Jan. 13, 1967, and entitled "Fluid Motors for Winches" wherein the radial bearings 4 and 7 and the thrust bearings 5 of both the main rotor 2 and the sealing rotor 6 are adjustable. The radial bearings 4 are adjusted radial by axial movement of a tapering member against the inner ring of the radial bearings 4 and 7 which is also tapered.

The thrust bearings 5 and 8 are axially adjustable by axial movement of adjusting nut or rings and suitable distance pieces between the rings and the housing.

I claim:

1. A fluid motor including a housing having a main rotor located in accurate radial and thrust bearings and provided with blades, a sealing rotor located in accurate radial and thrust bearings and having slots and rotatably mounted on an axis parallel to and in plane with the rotary axis of the main rotor, gear means connecting the main rotor and sealing rotor together so that they rotate simultaneously in opposite directions in different cylindrical compartments in the housing in which they are hydraulically balanced axially and radially, the two cylindrical compartments having a mutual longitudinal opening so that the blades can enter the slots provided in the sealing rotor without sealing contact therewith, the blades protruding axially from the main rotor and sealing with the housing, the sealing areas of the main rotor which seals against the housing, the blades and the sealing areas of the sealing rotors which seals against the housing and against the main rotor, are adapted to be capable of lapping in to make a close sealing fit by rotation of the rotors to the accuracy of the radial and thrust bearings whereby the rotors can rotate hydraulically balanced axially and radially in the housing under the highest hydraulic pressure for which the parts of the motor is made.

2. A hydraulic motor as claimed in claim 1 where the sealing material is a plastic material secured to the rotors.

3. A hydraulic motor as claimed in claim 1 where the sealing material is a suitable metal secured to the rotors.

4. A hydraulic motor as claimed in claim 1 where suitable sealing material is secured to the housing.

References Cited

UNITED STATES PATENTS

| | | | |
|---|---|---|---|
| 2,633,083 | 3/1953 | Smith | 103—128 |
| 2,966,860 | 1/1961 | Maynard. | |

FOREIGN PATENTS

| | | |
|---|---|---|
| 638,146 | 2/1928 | France. |
| 753,772 | 8/1956 | Great Britain. |
| 908,116 | 10/1962 | Great Britain. |

EVERETTE A. POWELL, Jr., Primary Examiner

U.S. Cl. X.R.

103—125, 126, 128